(12) United States Patent
Pone et al.

(10) Patent No.: US 12,006,005 B2
(45) Date of Patent: Jun. 11, 2024

(54) BOATERS SAFE DISTANCE WARNING DEVICE

(71) Applicants: Cassandra S. Pone, Mattawan, MI (US); Martis Pone, Mattawan, MI (US)

(72) Inventors: Cassandra S. Pone, Mattawan, MI (US); Martis Pone, Mattawan, MI (US)

( * ) Notice: Subject to any disclaimer, the term of this patent is extended or adjusted under 35 U.S.C. 154(b) by 204 days.

(21) Appl. No.: 17/737,916

(22) Filed: May 5, 2022

(65) Prior Publication Data

US 2022/0411030 A1    Dec. 29, 2022

Related U.S. Application Data

(60) Provisional application No. 63/213,866, filed on Jun. 23, 2021.

(51) Int. Cl.
*B63B 43/18* (2006.01)
*B63B 49/00* (2006.01)
*G01S 19/17* (2010.01)
*G01S 19/48* (2010.01)
*G06V 20/56* (2022.01)
*G08G 3/02* (2006.01)

(52) U.S. Cl.
CPC .............. *B63B 43/18* (2013.01); *B63B 49/00* (2013.01); *G01S 19/17* (2013.01); *G01S 19/485* (2020.05); *G06V 20/56* (2022.01); *G08G 3/02* (2013.01); *B63B 2213/02* (2013.01)

(58) Field of Classification Search
CPC ..... B63B 43/18; B63B 49/00; B63B 2213/02; G01S 19/485; G01S 19/17; G06V 20/56; G08G 3/02
USPC .......................................... 340/984
See application file for complete search history.

(56) References Cited

U.S. PATENT DOCUMENTS

| | | | | |
|---|---|---|---|---|
| 5,483,336 | A * | 1/1996 | Tocher | G01C 3/04 396/125 |
| 5,589,910 | A * | 12/1996 | Saito | G03B 7/09979 396/97 |
| 10,081,411 | B1 * | 9/2018 | Bello | B63B 22/166 |
| 10,460,605 | B2 * | 10/2019 | Luhmann | B60W 30/095 |
| 2018/0056745 | A1 * | 3/2018 | Saylor | B60G 17/0165 |
| 2019/0155287 | A1 * | 5/2019 | Arbuckle | G08G 3/02 |
| 2019/0188637 | A1 * | 6/2019 | Endo | G06T 1/0007 |
| 2021/0088667 | A1 * | 3/2021 | Heling | G01S 17/87 |
| 2022/0082406 | A1 * | 3/2022 | Zhang | G06V 20/582 |

* cited by examiner

*Primary Examiner* — Kerri L McNally
(74) *Attorney, Agent, or Firm* — Kohn & Associates PLLC

(57) ABSTRACT

A device for measuring shoreline distance and distance to objects on a boat, including a measurement mechanism for measuring shoreline distance and object distance including a global positioning system (GPS) in combination with a camera and sensor. A method of determining shoreline distance and distance to objects on a boat, by actuating the device, measuring the shoreline distance and object distance from the boat, and displaying the shoreline distance and object distance on the graphical interface display.

15 Claims, 1 Drawing Sheet

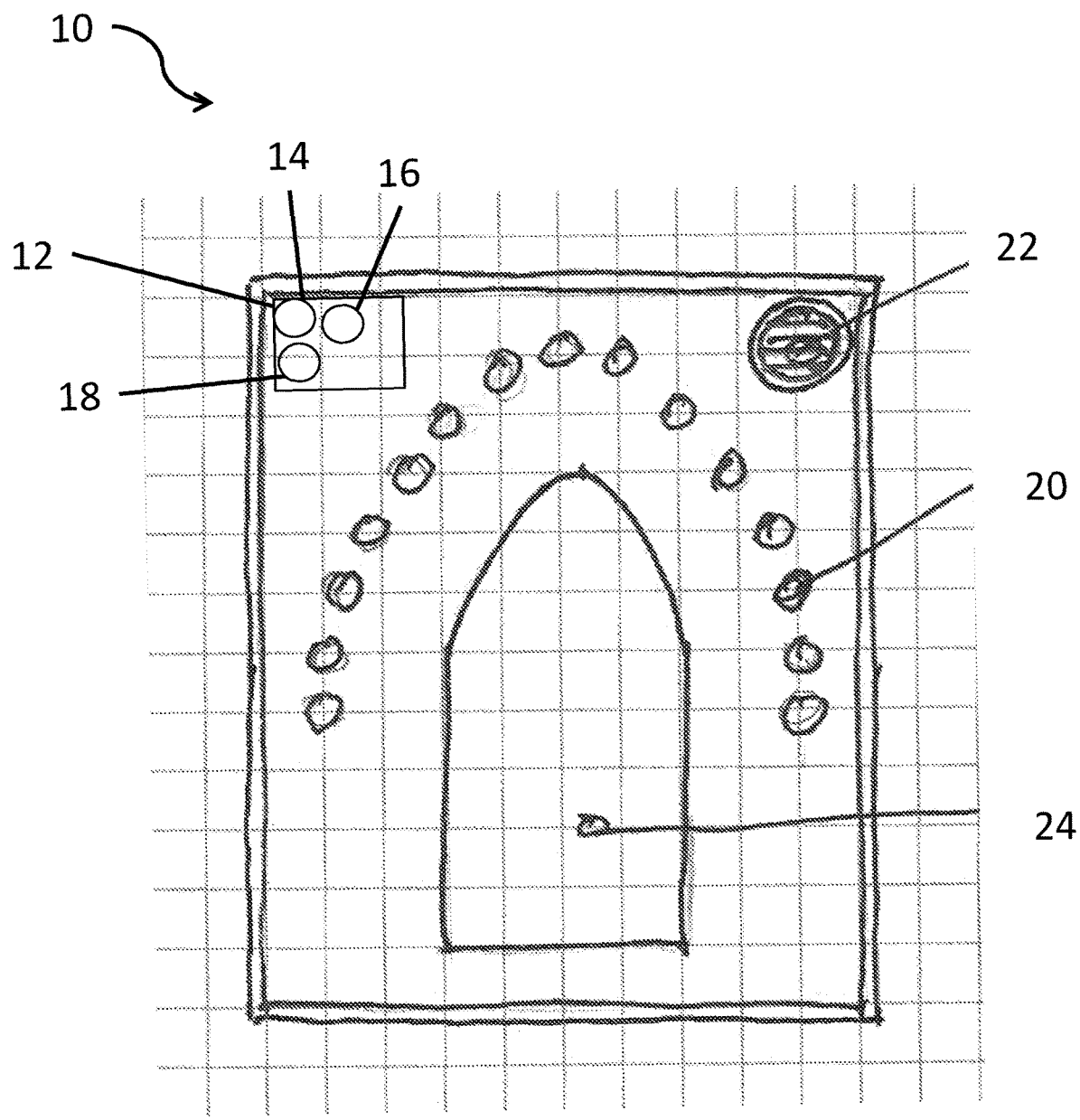

BOATERS SAFE DISTANCE WARNING DEVICE

BACKGROUND OF THE INVENTION

1. Technical Field

The present invention relates to compositions and methods for determining distances of boats from shore or other objects.

2. Background Art

When boating on any inland lake, there exist regulations that restrict navigating at speed within 100 feet of shore, dock, raft, or marked swim areas, or 150 feet for personal watercraft (this is for example, in Michigan, other localities can have other regulations). However, measurement of this distance, by boater or authorities, is subjective, in almost all cases "by eying it". This creates two problems.

First is a problem of safety, with the boat getting too close to actual hazards for potential collisions, getting too close to swimmers and doing actual bodily harm, and getting too close to shore/features to cause damage with wakes/swells. Boaters want to know for certain that they are complying and being safe in their actions. They do not want to "eyeball it". The pulling or towing of a skier, a boarder or tuber makes this even more problematic, because the regulation applies to them, as well.

Second is a problem of enforcement as the "too close to shore" ticketing of boaters is based on a non-quantified, subjective determination by the authorities of actual distance (as well as the "citizens arrest" attitude of many lakefront home owners) and subsequent possible safety/equipment checks, personal record checks, dui checks, etc. that a stop opens the operator up to.

Many boats make use of a depth meter, which sends a signal from a transducer at the bottom of a boat to the bottom of a body of water, and then measures time it takes for the signal to bounce back to the transducer to calculate the distance to the bottom. Radar is able to calculate the distance to the shoreline; however, this is cost-prohibitive to many recreational boats.

U.S. Pat. No. 10,324,468 to Arbuckle, et al. discloses a system for controlling a position of a marine vessel near an object that includes a location sensor (such as GPS), a speed sensor, a direction sensor, and a rotational sensor, and at least one proximity or vision-based sensor (which can be radar, sonar, LIDAR, cameras, lasers, Doppler direction finders, RFID tags/receivers) that determines both the relative location and distance of an object such as a shoreline or other objects. A virtual map of the object can be created. A control module is in communication with the sensors and a propulsion system to move the vessel to a position with respect to an object. Arbuckle, et al. does not disclose use of the system to keep a particular distance from a shoreline and does not provide warnings of being too close to the shoreline.

U.S. Patent Application Publication No. 2021/0088667 to Heling, et al. discloses a system for navigating a marine vessel to a desired position with respect to a waterline boundary. The system uses LIDAR sensors to identify shoreline and other objects in the water. A predetermined distance from shoreline can be maintained with trolling motor heads. This system only uses expensive LIDAR to determine distance from shore. While the system of Heling, et al. provides a warning when the marine vessel is about to collide with an obstruction, there is no warning system that a distance from shore is too close.

There is currently not a device that is capable of both detecting distance of a boat to shoreline as well as other objects in and around the water. Therefore, there remains a need for a method of accurately determining the distance of a boat to the shoreline and to other objects.

SUMMARY OF THE INVENTION

The present invention provides for a device for measuring shoreline distance and distance to objects on a boat, including a measurement mechanism for measuring shoreline distance and object distance including a global positioning system (GPS) in combination with a camera and sensor.

The present invention also provides for a method of determining shoreline distance and distance to objects on a boat, by actuating the device, measuring the shoreline distance or object distance from the boat, and displaying the shoreline distance and object distance on the graphical interface display.

DESCRIPTION OF THE DRAWINGS

Other advantages of the present invention are readily appreciated as the same becomes better understood by reference to the following detailed description when considered in connection with the accompanying drawings wherein:

FIG. 1 is a top view of a device for measuring shoreline distance and distance to objects on a boat.

DETAILED DESCRIPTION OF THE INVENTION

The present invention provides for a device, shown at 10 in FIG. 1, and method for measuring shoreline distance or distance to an object on a boat 24. The device 10 includes a measurement mechanism 12 for measuring shoreline distance or distance to other objects. By use of this device, a boater can avoid entering areas prohibited by law (too close to shoreline) and areas of danger (too close to swimmers, other boats, buoys, etc.).

The measurement mechanism 12 uses a global positioning system (GPS) 14 in combination with a camera 16 and sensor(s) 18 to determine the position of the boat 24 relative to the shoreline or other objects. Each of these components can be used to determine shoreline or object distance, or a single component or combinations of components can be used for particular measurements.

A GPS receiver in the measurement mechanism receives a signal from at least four different satellites and calculates the position of the boat. Time information in codes broadcast from a satellite is read by the receiver in order to compute the locations of the satellite. The receiver uses the time difference between the time of signal reception and the broadcast time to compute the distance from the receiver to the satellite. A receiver can compute latitude, longitude, altitude, and time.

The camera can take a picture of the shoreline. The sensor can use technologies such as, but not limited to, infrared (IR), laser, or autonomous vehicle sensor technology. Sonar and radar can be used as well. The combination of the camera and sensor measure the distance to the shoreline or other objects in the water such as docks, ramps, platforms, etc. that need to be avoided from a particular distance. Since the actual shoreline is constantly changing with waves and tides and can be periodic, the camera and sensor can provide an average measurement over a period of time. An algorithm in the measurement mechanism can calculate the distance between the GPS position of the boat and the shoreline. Artificial intelligence can be used in calculating the shoreline.

The GPS, camera, and sensor can work together such as in lane guidance programs that detect which lane a car is in on the road and can warn when the car is in the wrong lane or drifting into a lane. Data points can also be set, such as in U.S. Pat. No. 10,507,895, which allows a user to mark a point with a GPS, and then use a trolling device to return to that GPS point in a boat. There can be multiple GPS points set that follow a certain distance from shoreline, and the boat can follow from point to point to stay the required distance from shoreline.

The device can be surface mounted in a boat and/or attached or built-in to the boat. In other words, the device can be attached and used in existing boats or integrated directly into the electronics of new boats.

The device can be programmable for different settings, such as the type of boat (boat, tow boat, personal watercraft, fishing, custom), and the regulations (i.e. shoreline distance requirements) of a particular body of water.

The device 10 can include alarms that include audible 20 and/or visual signals 22 (such as a red light if too close, a yellow light if approaching too close of a distance, and green light if an acceptable distance from shoreline/object) that warn that the boat 24 is approaching and/or exceeding a threshold distance. Accordingly, the boater can avoid entering a prohibited area as well as avoiding an accident or collision.

The device can include a graphical interface either operatively attached thereto or wirelessly connected thereto (such as a smart phone screen, tablet screen, or portable computer screen). The graphical interface displays the relation or distance of the boat to the shoreline and/or other objects.

The device can interface with a portable electronic device (smart phone or tablet) through an application stored on non-transitory computer readable media, and the various alarms or settings can be programmed through the application.

The device can track and store shoreline/object distance data in a database on non-transitory computer readable media as evidence of compliance if a boater is faced with disciplinary action or accusation. Data can be gathered over a range of time such as every second, every minute, every 10 minutes, every 30 minutes, etc. If a boater is questioned by authorities, the boater can show the data from the device (with the graphical interface or portable electronic device) to prove that they were in compliance with regulations.

The device can further include a point-and-shoot handheld measurement mechanism, that can be operatively attached or in wireless connection with the device. This allows for more pinpoint aiming accuracy of the shoreline or object distance. The handheld measurement mechanism can also include data record keeping that can aid in providing evidence to authorities that the boat was a legal distance to shore.

In view of the above, the device utilizes a combination of position tracking, object sensors, alarm, and knowledge of distance regulations to warn the boater of entering prohibited space or approaching a dangerous situation such as a collision with another boat, swimmer, trap, or other object. None of these components alone can provide the safety and regulation compliance of the present invention.

The present invention also provides for a method of determining shoreline distance and distance from objects on a boat, by actuating the device, measuring the shoreline distance or distance from an object from the boat with the measurement mechanism, and displaying the shoreline distance or object distance on the graphical interface display. The method can further include storing shoreline or object distance data in the database. The method can further include providing an alarm if a threshold distance is approached and/or exceeded.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A device for measuring shoreline distance and distance to objects on a boat, comprising a measurement mechanism for measuring shoreline distance and object distance including a global positioning system (GPS) in combination with a camera and sensor, said device being programmed with shoreline and object distance regulations for determining legal threshold distances from shoreline and objects, and said device including an audible and visual alarm in communication with said measurement mechanism that warns a boater if said boat is approaching and/or exceeding a threshold distance.

2. The device of claim 1, wherein said GPS receives a signal from at least four different satellites and calculates a position of the boat.

3. The device of claim 1, wherein said camera takes a picture of a shoreline.

4. The device of claim 1, wherein said sensor uses a technology chosen from the group consisting of infrared, laser, and autonomous vehicle technology.

5. The device of claim 1, wherein said camera and sensor measure object distance of an object chosen from the group consisting of shoreline, docks, ramps, and platforms.

6. The device of claim 1, wherein said camera and sensor provide an average measurement of distance over a period of time.

7. The device of claim 1, wherein said device allows for data points to be set with the GPS.

8. The device of claim 1, wherein said device further includes a graphical interface for displaying the distance of said boat to the shoreline or an object.

9. The device of claim 1, wherein said device interfaces with a portable electronic device through an application stored on non-transitory computer readable media.

10. The device of claim 1, wherein said device stores shoreline distance and object distance data in a database on non-transitory computer readable media.

11. The device of claim 1, wherein said device includes a point-and-shoot handheld measurement mechanism.

12. A method of determining shoreline distance and distance to objects on a boat, including the steps of:

actuating a device for measuring shoreline distance and object distance including a global positioning system (GPS) in combination with a camera and sensor, the device being programmed with shoreline and object distance regulations for determining legal threshold distances from shoreline and objects;

measuring the shoreline distance and object distance from the boat with the device;

displaying the shoreline distance and object distance on a graphical interface display on the device; and providing an audible and visual alarm if the boat is approaching and/or exceeding a threshold distance.

13. The method of claim 12, wherein the GPS receives a signal from at least four different satellites and calculates a position of the boat, the camera takes a picture of a shoreline, and the sensor uses a technology chosen from the group consisting of infrared, laser, and autonomous vehicle technology.

14. The method of claim 12, further including the step of storing shoreline distance and object distance data in a database on non-transitory computer readable media.

15. The method of claim 12, wherein said measuring step further includes measuring distance of the boat to an object chosen from the group consisting docks, ramps, and platforms.

* * * * *